(12) United States Patent
Tannas et al.

(10) Patent No.: US 11,903,341 B2
(45) Date of Patent: Feb. 20, 2024

(54) PORTABLE OPERATOR-ENGAGEABLE NATIVE SEED HARVESTER

(71) Applicant: Great Plains Restoration Solutions Inc., Cremona (CA)

(72) Inventors: Steven Tannas, Cremona (CA); James Luyendyk, Cremona (CA)

(73) Assignee: GREAT PLAINS RESTORATION SOLUTIONS, INC., Cremona (CA)

( * ) Notice: Subject to any disclaimer, the term of this patent is extended or adjusted under 35 U.S.C. 154(b) by 188 days.

(21) Appl. No.: 17/401,580

(22) Filed: Aug. 13, 2021

(65) Prior Publication Data
US 2022/0346318 A1    Nov. 3, 2022

(30) Foreign Application Priority Data

May 3, 2021    (CA) .................................. CA 3116938

(51) Int. Cl.
*A01D 45/30*    (2006.01)

(52) U.S. Cl.
CPC .................................. *A01D 45/30* (2013.01)

(58) Field of Classification Search
CPC .............. A01D 34/416; A01D 34/4168; A01D 34/435; A01D 34/90; A01D 45/003; A01D 45/04; A01D 45/22; A01D 45/30; A01D 75/008; A01F 5/00
See application file for complete search history.

(56) References Cited

U.S. PATENT DOCUMENTS

| | | | |
|---|---|---|---|
| 4,290,257 A * | 9/1981 | Frantello ............ | A01D 34/4166 30/276 |
| 5,372,002 A | 12/1994 | Collicutt | |
| 6,176,015 B1 * | 1/2001 | Morabit ............ | A01D 34/4168 30/276 |
| 6,868,659 B2 | 3/2005 | Arbuckle et al. | |
| 8,869,498 B1 | 10/2014 | Bremmer | |
| 10,681,906 B2 | 6/2020 | Lambert | |
| 2007/0022614 A1 * | 2/2007 | Zimmermann ........ | A01D 34/90 30/286 |
| 2014/0215990 A1 * | 8/2014 | Dysinger ............... | A01D 45/28 56/14.5 |
| 2018/0220582 A1 * | 8/2018 | Trombino .......... | A01D 34/4165 |
| 2021/0386014 A1 * | 12/2021 | Rethaber .............. | A01D 34/733 |

FOREIGN PATENT DOCUMENTS

| | | | | |
|---|---|---|---|---|
| CN | 112293054 A | * | 2/2021 | |
| EP | 005540 A1 | * | 5/1979 | ............ A01D 55/18 |
| KR | 940000128 | * | 10/1991 | ............ A01D 11/00 |
| KR | 20101186020 B1 | * | 11/2010 | ............ A01D 34/90 |
| KR | 20120050098 A | * | 11/2010 | ............ A01D 34/67 |
| WO | WO-2012032199 A1 | * | 3/2012 | ............ A01D 11/00 |

* cited by examiner

*Primary Examiner* — Alicia Torres
(74) *Attorney, Agent, or Firm* — Billion & Armitage; Benjamin C. Armitage

(57) ABSTRACT

Disclosed herein are handheld seed harvesters comprising: an elongate handle housing a driveshaft; a motor engaged with the elongate handle and the driveshaft; a reel rotatably and demountably engaged with the elongate handle and driveshaft by way of a quick-release system at an end opposite the motor, the reel having a plurality of filaments for removing seeds from plants extending outward therefrom; a hopper partially housing the reel for collecting the seeds; a handle assembly secured to the elongate handle and the hopper; and a shoulder strap securable to the elongate handle for carrying the harvester.

7 Claims, 8 Drawing Sheets

PORTABLE OPERATOR-ENGAGEABLE NATIVE SEED HARVESTER

This application claims benefit of U.S. Pat. No. 3,116,938, filed on May 3, 2021 in Canada and which application is incorporated herein by reference. A claim of priority is made.

TECHNICAL FIELD

This disclosure generally relates to agricultural harvesters. More specifically, this disclosure pertains to handheld harvesters for collecting seed from plants.

BACKGROUND

Seed harvesters are used to harvest seeds from plants without damaging the plants. There are many types of seed harvesters, including towable harvesters, front-loaded harvesters, and handheld harvesters. Handheld seed harvesters are generally transportable and operable by a single operator without the need for other equipment, while towable harvesters and front-loaded harvesters are typically towed or pushed by equipment such as tractors, quad bikes, and the like, respectively.

Handheld seed harvesters are useful in that they may be operated in areas that are unsuitable for, or inaccessible by, towable harvesters and front-loaded harvesters. For example, certain terrain may be not be navigable by the equipment used to tow or push seed harvesters. As well, in some cases, certain environments may be regulated to protect the native plants and animals. Such regulations may prevent the equipment required to tow or push harvesters from being used in those environments. However, in such circumstances, handheld seed harvesters are generally useful as they are transportable and operable by a single operator.

Conventional handheld seed harvesters however, may not be particularly adaptable for harvesting seed from different varieties of plants. For example, some conventional handheld seed harvesters may be configured for plants within a specific height range. Further, conventional handheld seed harvesters may be configured with only one type of seed-stripping mechanism, that may be suitable for harvesting seeds from only few certain types of plants.

SUMMARY

Embodiments of the present disclosure generally relate to handheld seed harvesters.

An example of an embodiment according to the present disclosure pertains to a handheld seed harvester comprising an elongate handle housing a driveshaft with a motor engaged at one end of the elongate handle and driveshaft. The other end of the elongate handle and driveshaft are engaged with a bevel gear housing and assembly. An elongate open-faced hopper housing extending sideways from the elongate handle is pivotably engaged with the bevel-gear housing and with a handle assembly engaged with the elongate handle. A drive roller is engaged with driveshaft extending outward from the bevel gear housing. The end of the open-faced hopper housing opposite the end attached to the bevel gear housing is provided with a spring-loaded idler facing the drive roller. The drive roller and spring-loaded idler are configured to cooperate as a quick-release mechanism for rotatably and demountably engaging the ends of an elongate reel provided with a plurality of filaments extending outward therefrom for harvesting seeds from plants. The open-faced hopper housing partially houses the elongate reel for collecting and directing the harvested seeds into a demountable hopper bag positioned underneath and demountable engaged with the hopper housing. The handheld seed harvester additionally comprises a handle assembly secured to the elongate handle and the hopper housing, and a demountable securable shoulder strap securable to the elongate handle for carrying, operating, and manipulating the seed harvester. According to an aspect, the handheld seed harvester additionally comprises one or more seed-harvesting reels configured for demountable engagement with the drive roller and spring-loaded idler quick-release mechanism. According to another aspect, the handheld seed harvester additionally comprises one or more hopper bags configured for demountable engagement with the hopper housing.

According to another embodiment, the drive roller of the quick-release system may be provided with one or more lugs extending outward from the circumference of the drive roller to engage one or more slots provided therefor in one or both ends of the reel. Alternatively, the drive roller of the quick-release system may be provided with one or more set screw heads extending outward from the circumference of the drive roller to engage one or more slots provided therefor in one or both ends of the reel.

According to another embodiment, the hopper housing is pivotable between a first position and a second position along the elongate handle by attachment points for the handle assembly on the hopper.

In yet another embodiment, the plurality of filaments extending outward from an elongate seed-harvesting reel may comprise filaments having a diameter of 0.17 mm, filaments having a diameter of 0.24 mm, or filaments having a diameter of 0.33 mm. According to an aspect, two or more of the filaments having diameter of 0.33 mm comprise a cap engaged therewith their ends.

BRIEF DESCRIPTION OF THE FIGURES

The embodiments of the present disclosure will be described with reference to the following drawings in which.

DETAILED DESCRIPTION

Figure 1:
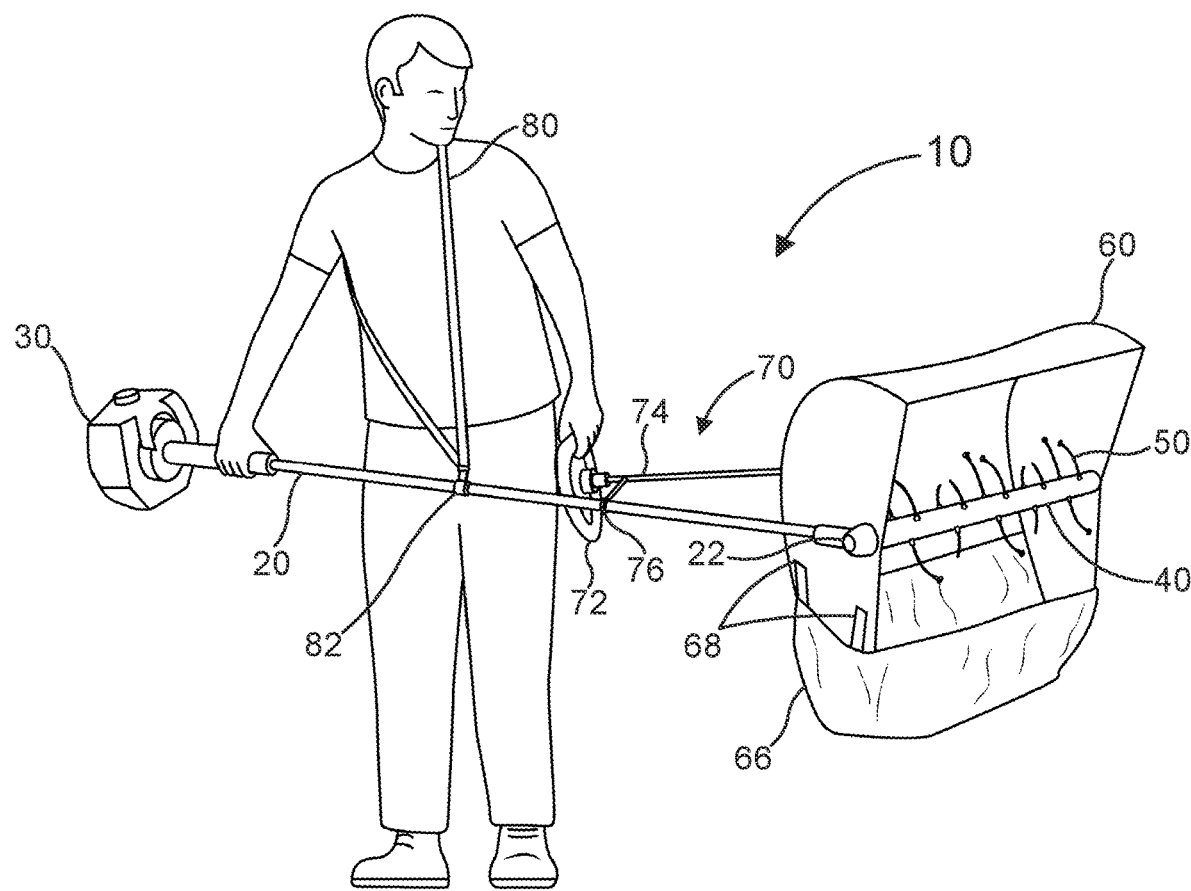
FIG. 1 is a side perspective view of a user holding a handheld seed harvester according to an embodiment of the present disclosure.

The embodiments of the present disclosure generally relate to handheld seed harvesters and in particular, to handheld seed harvesters that are readily configurable to harvest seeds from different types of plants.

One embodiment of the present disclosure pertains to a handheld seed harvester generally comprises an elongate handle that houses a drive shaft therein, and a motor engaged with the upper end of the elongate handle and the drive shaft. The lower end of the elongate handle and driveshaft housed therein, are engaged with a bevel-gear assembly having a short driveshaft extending outward therefrom perpendicular to the elongate handle. An elongate open-faced hopper is engaged with the housing of the bevel gear assembly engaged to lower end of the elongate handle, and extends sideways and outward sideways therefrom. The opposite ends of the elongate open-faced hopper are provided with cooperating components for quick-release demountable engagement with a reel configured for harvesting seeds. The handheld seed harvester additionally comprises a handle assembly engaged with the elongate open-faced hopper and the elongate handle. Also provided are a demountably engageable shoulder strap and a strap clamp therefor that is slidably engageable along and to the elongate handle.

As used herein, the term "handheld seed harvester" refers to an agricultural tool for stripping seeds from plants. The handheld seed harvester may be readily handled, operated, and maneuvered about by a single operator without the need for additional equipment or assistance.

As used herein, the term "reel" refers to a rotatable element of the handheld seed harvester for harvesting the seeds. The reel is rotatably and demountably engageable with the driveshaft, the bottom end of the elongate handle, and the elongate open-faced hopper via the cooperating quick-release components. The reel comprises a plurality of filaments spaced apart and extending outward therefrom such that rotation of the reel rotates the filaments therewith. The reel preferable has an elongate and hollow tubular shape. The ends of the reel are configured to quickly engage and disengage from the cooperating quick-release components provided therefor on outward extending driveshaft at the bottom of the elongate handle and the opposing end of the elongate open-face hopper.

As used herein, the term "quick-release mechanism" refers to a pair of cooperating components that are configured to quickly and easily receive and securely demountably engage therein an elongate tubular reel without the requirement for any tools, fasteners, or force.

As used herein, the term "filament" refers to an elongate piece of polymeric plastic material having a generally cord-like shape. During operation of the handheld seed harvester, the filaments on the rotating reel will collide with seed-bearing portions of plants having seeds, thereby stripping the seeds from the plants for delivery into the seed harvester. Particularly suitable filaments for use with the handheld seed harvesters disclosed herein are trimmer lines configured for use with motorized handheld weed trimmers.

As used herein, the term "hopper" refers to an elongate open-faced housing for the reels mounted to and engaged with the quick-release components provided therefor at the bottom end of the elongate hand and the opposing end of the hopper. In use, an operator will maneuver the rotating reel into contact with selected plants whereby seeds stripped from the plants by the rotating reel and filaments are directed by centrifugal force into the hopper housing from which they fall into and are collected in a detachable hopper bag underneath the hopper. Suitable elongate open-faced hoppers for use with the present handheld seed harvesters may be formed with or into a solid material such as sheet metal, fiberglass, plastics materials, and the like. Aso suitable are elongate open-faced hoppers having a solid-core or hollow-core tubular framework onto which may be demountably engaged a fabric covering or "skin". Suitable fabrics include woven poly (polyethylene) tarps, canvas tarps, polyethylene coated canvas tarps and the like. The term "hopper" as used herein additionally may be substituted for with the terms "hopper housing", "elongate hopper", and "elongate hopper housing".

Reference will now be made in detail to example embodiments of the disclosure, wherein numerals refer to like components, examples of which are illustrated in the accompanying drawings that further show example embodiments without limitation.

FIGS. 1 to 11 illustrate an example of a handheld seed harvester 10 and its components according to one embodiment of the present disclosure. The handheld seed harvester 10 comprises an elongate handle 20 housing therein a driveshaft (not visible) with a motor 30 engaged with the upper end of the elongate handle 20 and driveshaft. The bottom end of the elongate handle 20 and driveshaft are engaged with a bevel gear housing 22 and assembly. An elongate open-faced hopper 60 extends sideways from the elongate handle 20, and is pivotably engaged with the bevel-gear housing 22 and a handle assembly 70 that is engaged with the elongate handle 20. A drive roller 90 is engaged with a driveshaft extending outward from the bevel gear housing 22 and assembly. The end of the open-faced hopper housing 60 opposite the end attached to the bevel gear housing 22 is provided with a spring-loaded idler 100 facing the drive roller 90. The drive roller 90 and spring-loaded idler 100 are configured to cooperate as a quick-release mechanism for rotatably and demountably engaging the ends of an elongate reel 40 provided with a plurality of filaments 50a, 50b extending outward therefrom for harvesting seeds from plants. The open-faced hopper housing 60 partially houses the elongate reel 40 for collecting and directing harvested seeds into a demountable hopper bag 66 positioned underneath and demountable engaged with the hopper housing 60 by attachment means 68. The handheld seed harvester 10 additionally comprises a demountable securable shoulder strap 80 demountably securable to the elongate handle 10 by a slidably engageable clamp for carrying, operating, and manipulating the seed harvester. The shoulder strap 80 may also be referred to herein as a "shoulder harness" or a "carrying strap".

According to an aspect, the handheld seed harvester additionally comprises one or more seed-harvesting reels 40a, 40b, 40c configured for demountable engagement with the drive roller 90 and spring-loaded idler 100 quick-release mechanism. According to another aspect, the handheld seed harvester additionally comprises one or more hopper bags 66 configured for demountable engagement with the hopper housing.

The elongate handle 20 may be used by an operator to hold and operate the handheld seed harvester 10 as well as for engaging together the motor 30, the reel 40, and the hopper 60. The elongate handle 20 is hollow so that the drive shaft may be housed therein. In some aspects, the elongate handle 20 may have a length of about 1 m to about 2 m and may be formed of a metal such as stainless steel, aluminum, and the like.

The bevel gear housing 22 and assembly engaged with the bottom end of the elongate handle 20 and the hopper 60 may be angled so that the reel 40 and the hopper 60 are positioned in front of the operator during use, as shown in FIG. 1. The angle may be described in relation to the angle formed between the reel 40 and the elongate handle 20. In some aspects, the angle between the reel 40 and the elongate handle 20 may be about 90° to about 120°. In such aspects, the drive shaft may comprise a bevel gear assembly within the housing 22 (see, for example, FIG. 2A, FIG. 2B, and FIG. 3) to drive the reel 40 at an angle relative to the elongate shaft 20.

Figure 3:
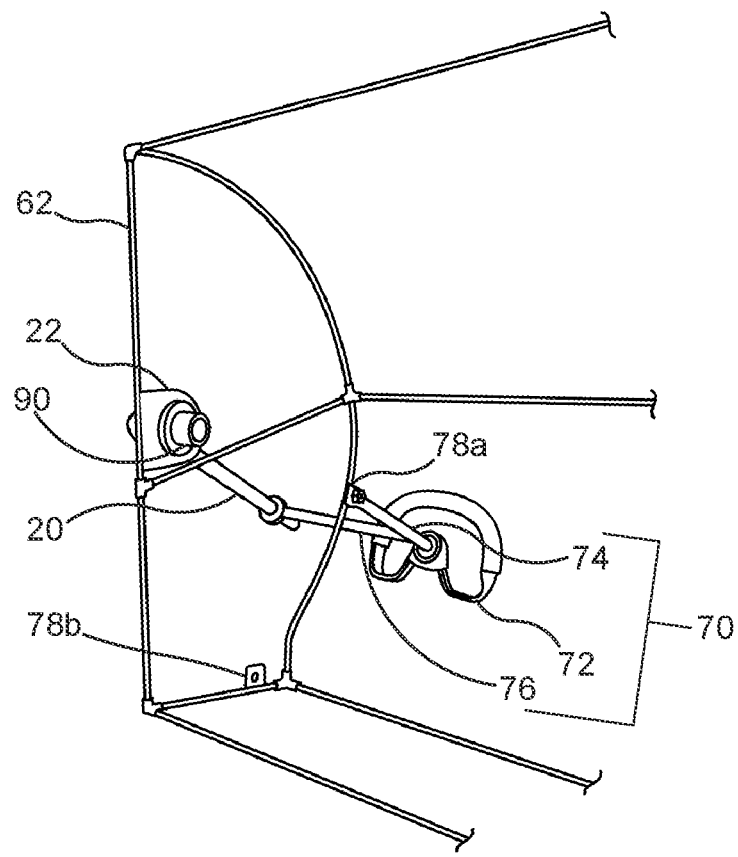
FIG. 3 is a partial perspective internal end view of the hopper framework engaged with the bevel gear housing and handle assembly according to an embodiment of the present disclosure.

The portable seed harvester 10 is shown in FIG. 3 with the reel 40 removed, revealing the end of the elongate handle 20 that is engaged with the reel 40 by way of the bevel gear housing 22. A drive roller 90 extends outward from the bevel gear housing 22 and provided with one or two set screws 96 extending laterally outward therefrom (FIGS. 4A, 4B) for demountable engagement with a slot(s) 42 at one end the reel 40 (FIG. 8) to thereby rotate the reel 40 when the motor 30 is turned on and engaged.

Figure 4A:
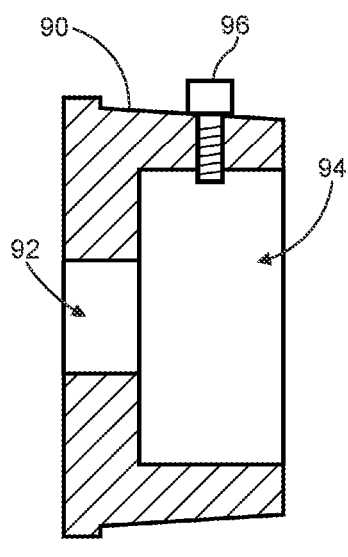
FIG. 4A is a cross section of a drive roller according to an embodiment of the present disclosure.
Figure 4B:
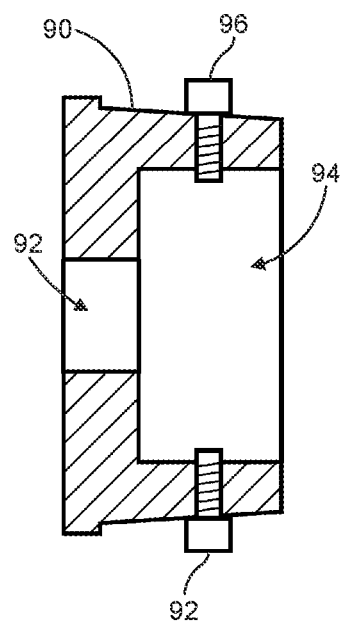
FIG. 4B is a cross section of a drive roller according to another embodiment of the present disclosure.

The drive roller 90 may be engaged with the drive shaft in a number of configurations. For example, as shown in FIG. 4A and FIG. 4B, the drive roller 90 may have a bore 92 through which may be received the driveshaft (or the second driveshaft portion, if present). The drive roller 90 may be installed on a splined washer (not shown), the splines configured to receive those on the driveshaft. To secure the drive roller 90 to the splined washer, a nut (not shown) may be tightened to an end of the driveshaft extending through the bore 92. The drive roller 90 may have a bore 94 to receive therein the nut, so that when the nut is installed, it is positioned within the drive roller 90. The nut therefore secures the drive roller 90 to the splined washer and, in turn, to the drive shaft such that rotation of the driveshaft causes the drive roller 90 to rotate.

Figure 5:
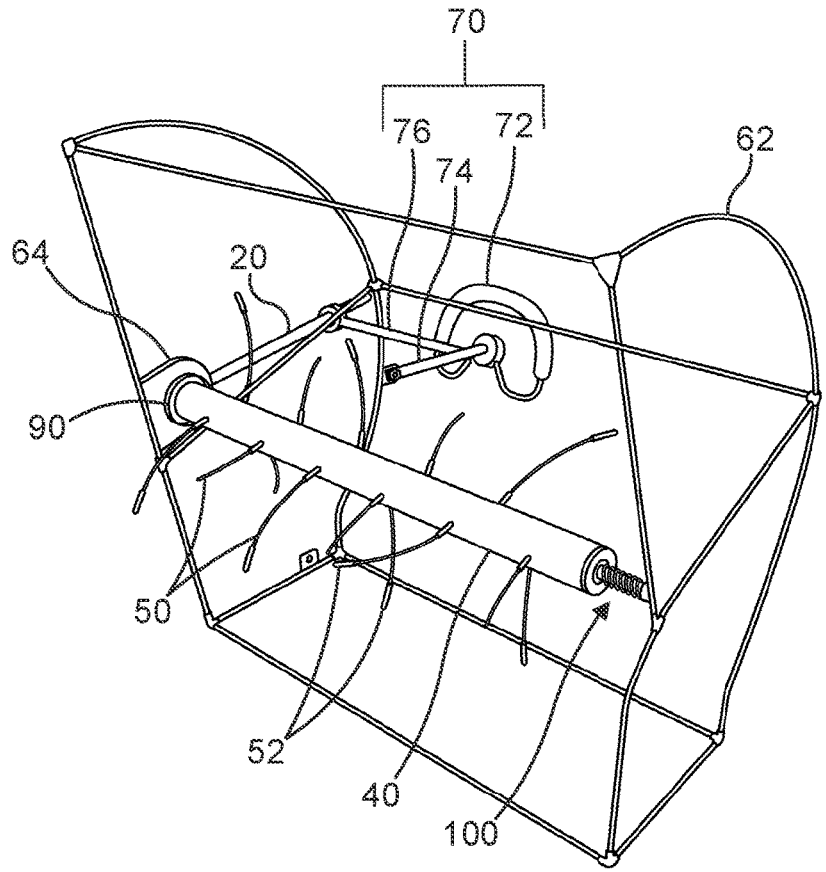
FIG. 5 is a front perspective view of a reel demountably engaged with the hopper housing framework according to an embodiment of the present disclosure.

FIG. 5 illustrates the reel 40 demountably engaged into hopper mounting plate 64 and the opposite end of the hopper framework 62 by the drive roller 90 and a spring-loaded idler 100 comprising a quick-release mechanism. When in operation, the reel is rotated clockwise by the motor 30 to thereby strip seeds from plants and direct them upwards and back into the hopper framework 62 by centrifugal force.

Figures 6A, 6B:
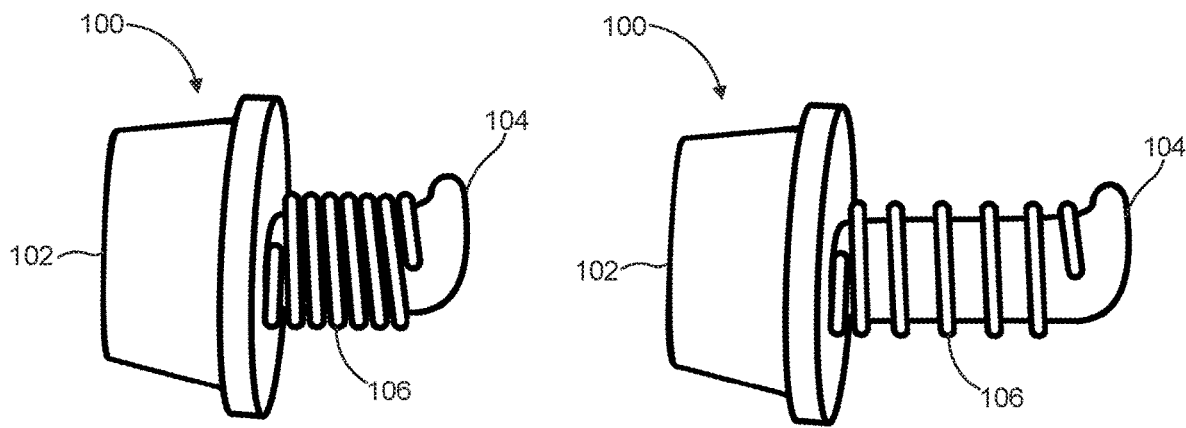
FIG. 6A is a side view of a compressed spring-loaded idler according to an embodiment of the present disclosure.
FIG. 6B is a side view of the spring-loaded idler of FIG. 6A when released.
Figure 7:
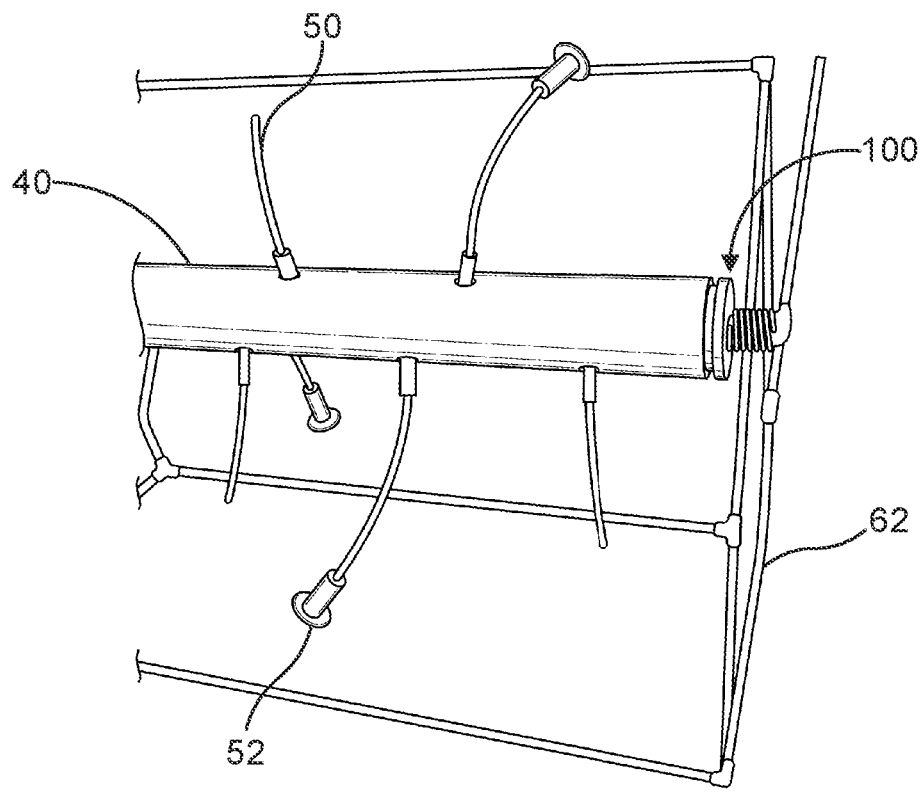
FIG. 7 is a partial perspective front view showing a reel demountably engaged with the spring-loaded idler on the hopper housing.
Figure 8:
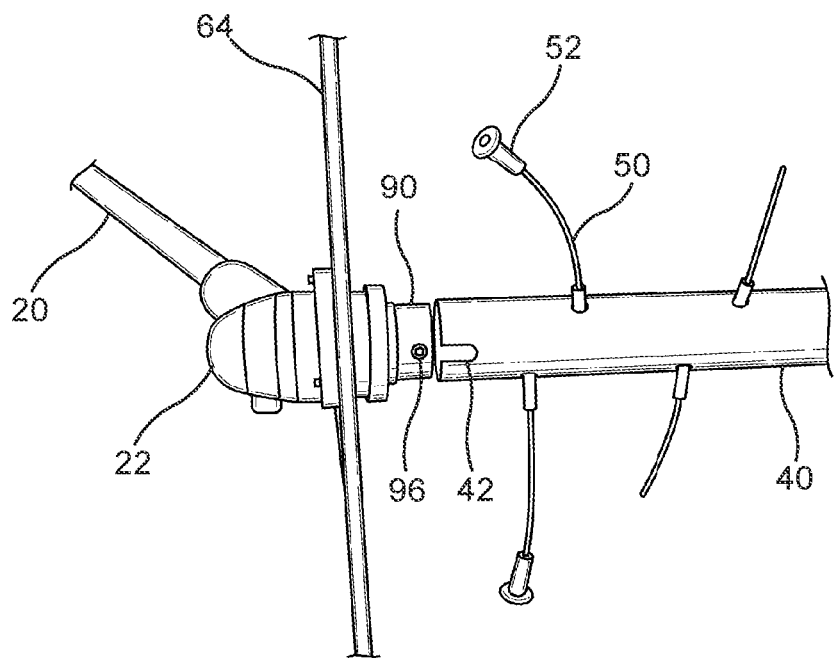
FIG. 8 is a partial front view showing the reel end being engaged with the drive roller.

The spring-loaded idler 100 component of the quick-release mechanism is shown in FIGS. 6A and 6B and is configured for simple attachment to the reel 40 as well as to apply pressure through the reel 40 in order to maintain the engagement of the reel 40 with the drive roller 90. In more detail, the spring-loaded idler 100 may comprise a portion 102 that is insertable into an end of the reel 40. The insertable portion 102 is slidably positioned on a stem 104, around which is disposed a spring 106. Thus, the spring-loaded idler 100 is compressible (FIG. 6A) and, once released, will return to its initial position (FIG. 6B). As shown in FIG. 5, the spring-loaded idler is securable to the hopper framework 62 at a point opposite the drive roller 90.

The quick-release system may also comprise one or more lugs 96 installed on a side of the drive roller 90, as shown in FIGS. 4A, 4B. The lugs may be, for example, set screws that have been installed into the side of the drive roller 90, as shown in FIGS. 4A, 4B. Alternatively, the one or more lugs 96 and the drive roller 90 may be formed as a single integrated part. The reel 40 may then comprise a corresponding one or more slots 42 for receiving therein the one or more lugs 96, the one or more slots 42 formed in the end of the reel 40 that is configured for engaging the drive roller 90.

Figure 9:
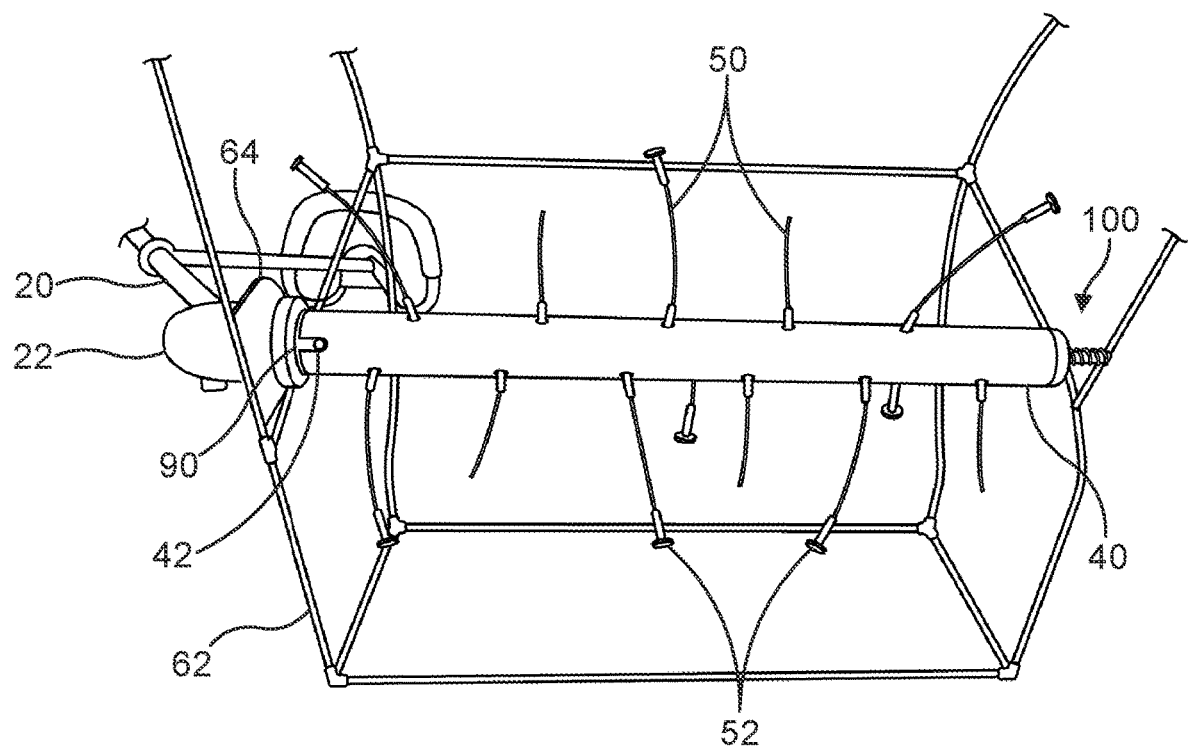
FIG. 9 is a front perspective view of the reel demountable engaged with the hopper housing framework.

In the above configurations, to install the reel 40, an operator may simply mount the reel 40 on the spring-loaded idler 100, depress the spring-loaded idler 100 (see FIG. 7) to fit the reel 40 between the sides of the hopper framework 62, align the one or more slots 42 of the reel 40 with the one or more lugs 96 on the drive roller 90 (see FIG. 8), and release the reel 40. Once the reel 40 is released, the spring 106 of the spring-loaded idler 100 will apply a constant pressure through the reel 40, keeping the reel 40 in place and preventing it from sliding away from the lugs 96. The installed reel 40 is shown in FIG. 9.

To release the reel 40, an operator simply has to depress the spring-loaded idler 100 and pull the reel 40 away from the hopper 60.

The drive roller 90 and the spring-loaded idler 100 may be independently manufactured from a plastic such as an acrylonitrile butadiene styrene (ABS), a polycarbonate, an ultra-high molecular weight polyethylene (UHMW), and the like, or a metal such as stainless steel, aluminum, and the like. In a particular aspect, at least the spring-loaded idler 100 is formed from a plastic. In such aspects, the spring-loaded idler may additionally dampen vibrations caused by the rotation of the reel 40, which may make the operation of the handheld seed harvester 10 more comfortable for an operator and may reduce operator fatigue.

Further, in some aspects, one or both of the drive roller 90 and the spring-loaded idler 100 may be tapered. In such aspects, tapers may facilitate the mounting and centering of the reel 40 on the drive roller 90 and the spring-loaded idler 100. A benefit from the tapers is reduction of vibrations transmitted from the reel to the elongate handle 20 and then to the operator during use to harvest seeds.

As previously described herein, the reel 40 is generally cylindrical and is at least partially hollow (at the ends thereof, for example) so that the reel 40 is engageable with the elongate handle 20 and drive shaft via the quick-release system. Further, the reel 40 may be formed of any suitable, durable material. In some aspects, the reel 40 may be made of a metal such as stainless steel, aluminum, and the like.

The reel 40 also has the plurality of filaments 50 extending outward therefrom. As previously described herein, the filaments 50 extend outward through apertures provided thererfor in the reel 50. The filaments 50 may be secured in the apertures of the reel 50 a number of ways. For example, the filaments 50 may be secured in the apertures using pop rivets. In more detail, the shafts of commercially available pop rivets may be removed and the filaments 50 inserted into the rivet bases in place of the shafts. The rivet bases may be secured to the filaments 50 by melting, flattening, and hardening one of the ends of the filaments 50 or by crushing one of the ends of the filaments 50, so that the ends of the filaments 50 cannot pull through the rivet base. Once the filaments 50 are secured to the rivet bases, the rivet bases may be inserted into the apertures in the reel 50 and crimped so that the rivet bases cannot be pulled through the apertures.

Figure 10A:
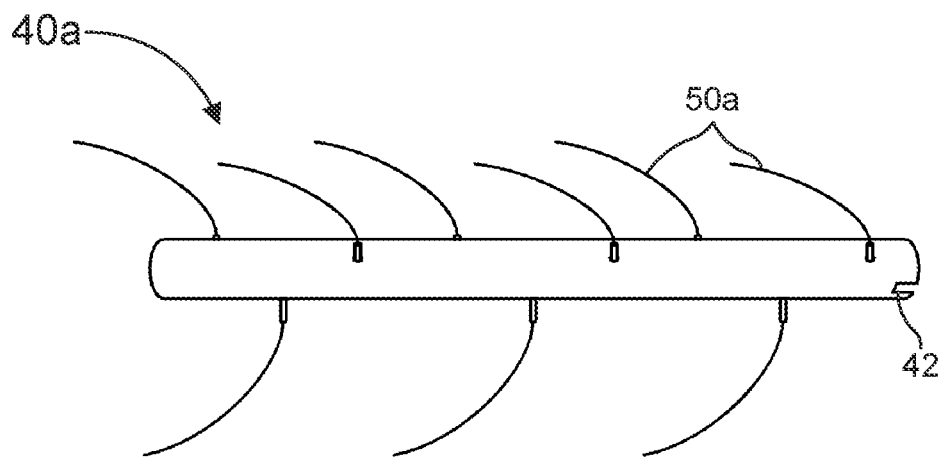
FIG. 10A is a front perspective view of a reel and a first set of filaments according to an embodiment of the present disclosure.
Figure 10B:
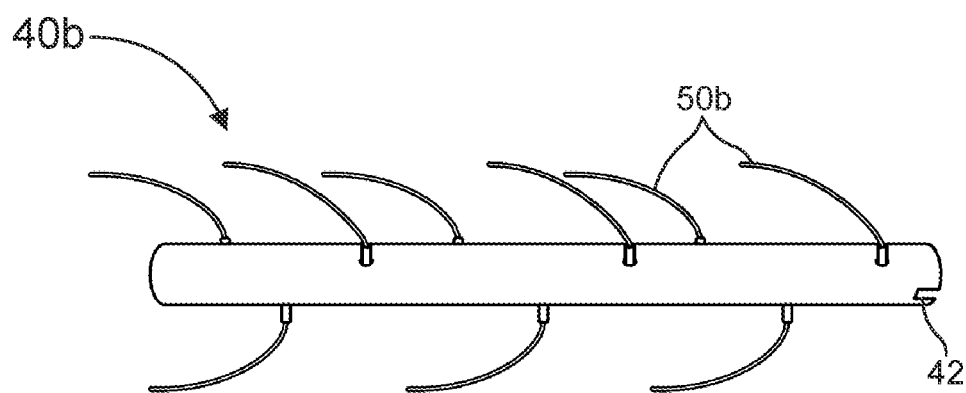
FIG. 10B is a front perspective view of a reel and a second set of filaments according to another embodiment of the present disclosure.
Figure 10C:
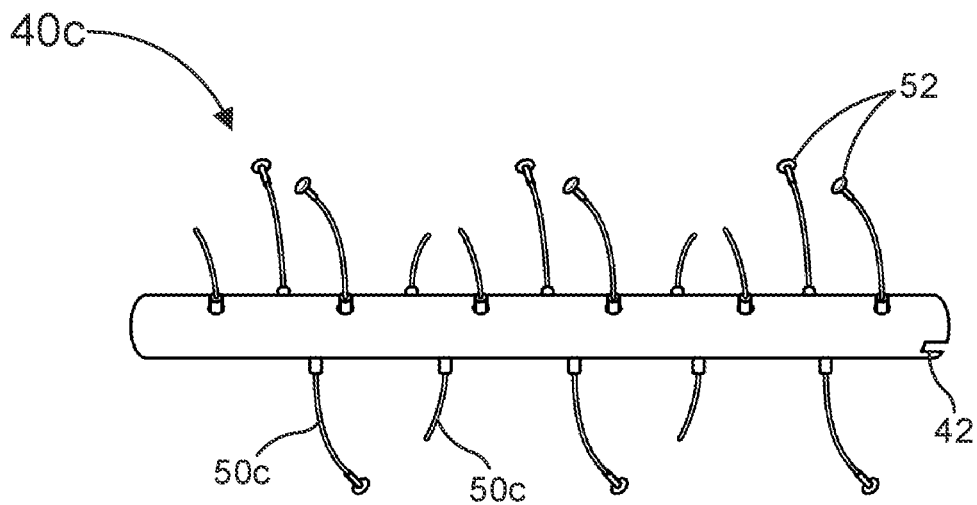
FIG. 10C is a front perspective view of a reel and a third set of filaments according to another embodiment of the present disclosure.

The filaments 50 may be any suitable commercially available trimmer lines. For example, the filaments may be 0.17 mm, 0.24 mm, or 0.33 mm diameter trimmer lines. Examples of filaments 50 having different diameters are shown in FIGS. 10A, 10B, 10C, wherein FIG. 10A shows a "light-duty" reel 40a provided with filaments 50a having a diameter of 0.17 mm, FIG. 10B shows a "medium-duty" reel 40b provided with filaments 50b having a diameter of 0.24 mm, and FIG. 10C shows a "heavy-duty" reel 40c provided with filaments 50c having a diameter of 0.33 mm. The light-duty reel 40a may be used for lighter, fluffy-seeded plants in low humidity conditions such as goldenrods, asters, and little bluestems. The medium-duty reel 40b may be used for light, fluffy-seeded plants in relatively humid conditions such as cool-season grasses, legumes, forbs, and herbs. The medium-duty reel 40b may also be used to harvest leaves from medicinal plants, herbs, and spice plants. The heavy-duty reel 40c may be used for tough-headed composite flowers and shrubs such as purple coneflowers, black eyed Susans, sunflowers, cup plants, compass plants, bergamots, wild roses, and any other plants where the entire flower head or berry needs to be removed to harvest the seeds.

In some aspects, the filaments 50 may comprise caps 52 thereon to facilitate the removal of seeds from certain types of plants. In general, the caps 52 may be used when the seeds of the plants are difficult to remove or if the entire flower heads or berries need to be removed to access the seeds. Thus, the caps 52 may be used with the filaments 50c of the heavy-duty reels 40 described above. The caps 52 may also be formed from pop rivets and may be attached to the filaments 50c in the same manner as previously described herein in respect to the securing of the filaments 50 in the apertures of the reel 40.

Further, the filaments 50 may have a length of about 12 cm to about 25 cm. In a particular aspect, the filaments 50 may have a length of about 20 cm. It is noted that the length of the filaments refers to the length thereof extending from the reel 40. In some aspects, the plurality of filaments 50 may comprise 5 to 15 filaments. In yet a further aspect, the filaments 50 may comprise 8 to 12 filaments. Furthermore, the filaments 50 may be spaced apart from each other about 10 cm to about 20 cm horizontally along the reel 40.

The hopper partially houses the reel 40. During operation, plants may be brought into contact with the reel 40 through the open face of the hopper 60 so that seeds may be stripped therefrom by the rotating filaments 50. The stripped seeds may then bounce off the internal surfaces of the hopper 60 to land in the hopper bag 66.

Figure 2A:
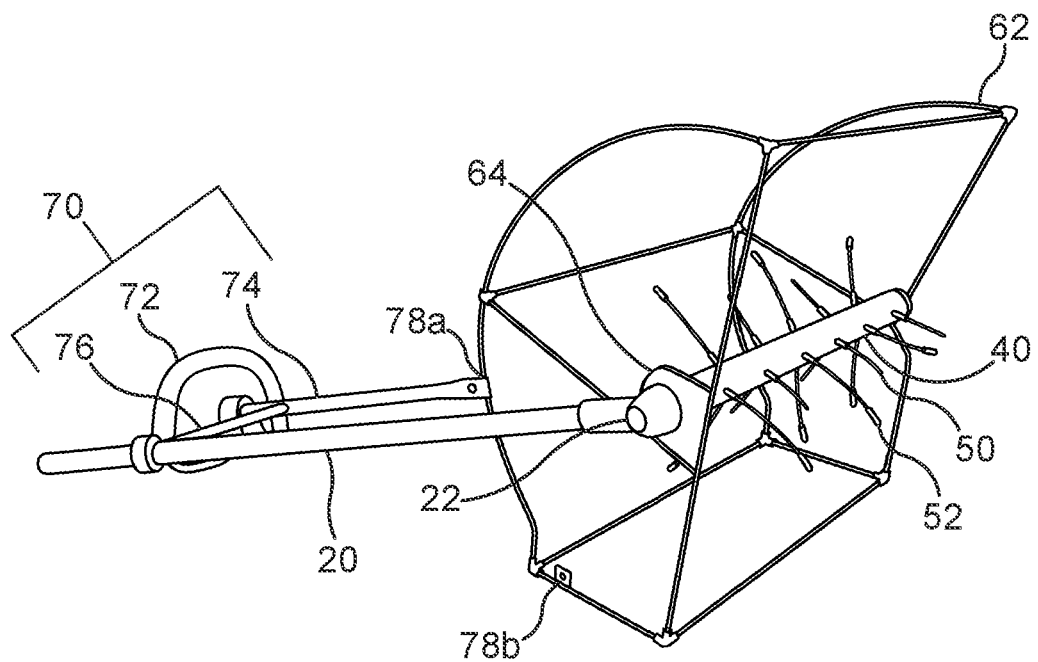
FIG. 2A is a side perspective view of a handheld seed harvester according to an embodiment of the present disclosure showing the hopper in a first position.
Figure 2B:
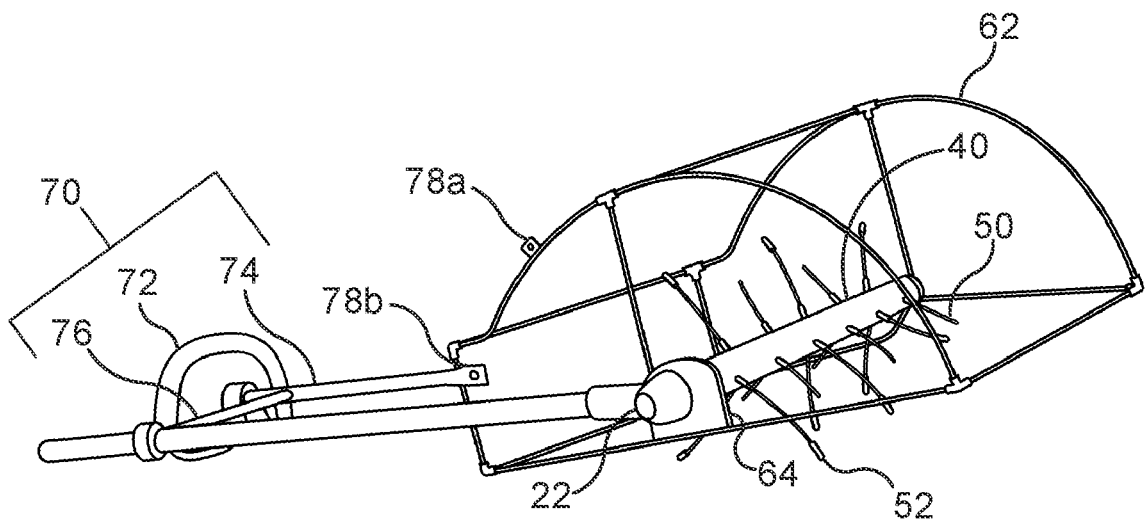
FIG. 2B is a side perspective view of the handheld harvester shown in FIG. 2A showing the hopper in a second position.

In more detail, the hopper 60 is secured to the same end of the elongate handle 20 as the reel 40. In some aspects, the hopper framework 62 comprises a plate 64 to which the elongate handle 20 may be secured, as shown in FIG. 2A, FIG. 2B, and FIG. 3. In such aspects, the plate 64 may contain apertures therein for alignment with apertures in the end of the elongate handle 20. Screws may be inserted through the apertures in the plate 64 and the elongate handle 20 and tightened to secure the hopper 60 or hopper framework 62 to the elongate handle 20.

In some aspects, the hopper 60 is pivotally connected to the end of the elongate handle 20 in cooperation with the handle assembly 70 such that the hopper may be pivoted forwards and backwards relative to the elongate handle 20. According to some aspects, the mounting arm 74 of the handle assembly 70 framework may be positioned at a first desired angle relative to the elongate handle 20 and secured in place to mounting arm attachment tab 78a provided therefor on the hopper framework 62 (FIG. 2A). The hopper 60 may be pivoted to a second desired angle by disengaging the mounting arm 74 from mounting arm attachment tab 78a, pivoting the hopper 60 to align and secure mounting arm 74 with mounting arm attachment tab 78b (FIG. 2B). The first position illustrated in FIG. 2A is particularly useful for harvesting seeds from taller plants. The second position illustrated in FIG. 2B is particularly useful for harvesting seeds from shorter plants.

According to an aspect, the hopper 60 may be integrally formed as shown in FIG. 1 with a lightweight metal such as mild steel, aluminum, and aluminum alloys. According to another aspect, the hopper 60 may be integrally molded as shown in FIG. 1 with a lightweight polymer such as high-density polyethylene (HDPE), ultra-high molecular weight polyethylene (UHMW), and the like.

According to other aspects, the hopper 60 may comprise a hopper framework 62 to which one or more textiles sown into a housing that defines the shape of the hopper 60, as shown in FIGS. 2A, 2B, 5, and FIG. 6 to FIG. 9. Suitable textiles include woven fabrics comprising synthetic fibers and/or natural fibers, and/or polymerized fibers. Also suitable are woven geotextiles, needle-punched geotextiles, heat-bonded geotextiles, and the like. The selected textile hopper housing 60 may be secured to the hopper framework 62 using any suitable fasteners such as hook and loop fasteners, quick-release two-piece buckle fasteners, VEL-CRO® tape strips (VELCRO is a registered trademark of Velcro IP Holdings LLC, Manchester, NH, USA), snap buttons, and the like.

According to an embodiment, there is provided one or more textile hopper bags 66 suitable for demountable engagement with the hopper 60. Suitable textiles include woven fabrics comprising synthetic fibers and/or natural fibers, and/or polymerized fibers. Also suitable are woven geotextiles, needle-punched geotextiles, heat-bonded geotextiles, and the like. The hopper bags 66 are configured to rapid demountable engagement with hopper bag attachment means 68 provided there for around the bottom perimeter of the hopper 60. Suitable hopper bag attachment means include hook and loop fasteners, quick-release two-piece buckle fasteners, VELCRO® tape strips, snap buttons, and the like.

Figure 11:
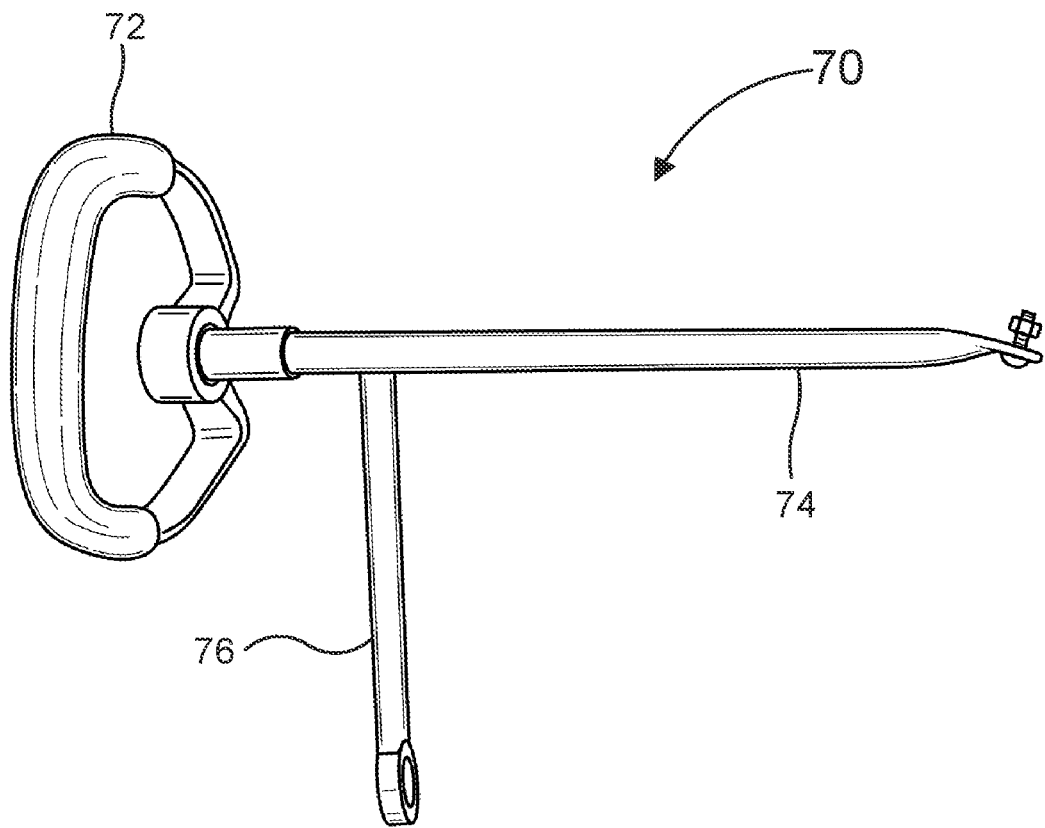
FIG. 11 is a top perspective view of the secondary handle assembly according to an embodiment of the present disclosure.

The handheld seed harvester 10 also comprises the handle assembly 70. The handle assembly 70 is securable to the hopper 60 (or the hopper framework 62) and the elongate handle 20. As shown in FIG. 11, the handle assembly comprises the grip 72, the mounting arm 74, and the stabilizing arm 76. The grip 72 may be any suitable shape for an operator to hold during use of the handheld seed harvester 10.

The mounting arm 74 is used to mount the handle assembly 70 to the hopper 60. The mounting arm 74 may be securable to the hopper 60 at a number of attachment points. For example, the mounting arm 74 may be secured to a first attachment point 78a or to a second attachment point 78b, as shown in FIG. 2A and FIG. 2B, respectively. As will be appreciated, the first attachment point 78a may be used when the hopper 60 is to be oriented in the first position, while the second attachment point 78b may be used when the hopper is to be oriented in the second position. The mounting arm 74 may be secured to the attachment points 78a, 78b using any suitable method. For example, as shown in the illustrated embodiment, the mounting arm 74 may have an aperture formed in an end thereof which may be aligned with an aperture in the attachment points 78a, 78b so that a screw, bolt, or the like may be inserted through the apertures to thereby secure the mounting arm 74 to one of the attachment points 78a, 78b.

The stabilizing arm 76 is used to adjustably secure the handle assembly 70 to the elongate handle 20. In more detail, the stabilizing arm 76 may be secured to the elongate handle 20 at any point selected by the operator to thereby position the handle assembly 70 such that it is easily accessible and comfortable to use. In some aspects, the stabilizing arm 76 comprises a split collar at an end thereof for adjustably securing the stabilizing arm 76 to the elongate handle 20. In operation, once the mounting arm 74 aligned with an attachment point 78a, 78b, the handle assembly may be tilted up or down to adjust the height of the grip 72 so that it is comfortable for the operator to use. As the handle assembly 70 is tilted up or down, the split collar of the stabilizing arm 76 will correspondingly slide up or down the elongate handle 20. Once a desired position is selected, the mounting arm 74 may be secured to the hopper 60, and the split collar may be tightened around the elongate handle 20, thereby securing the handle assembly 70 in place.

In some aspects, the stabilizing arm 76 may be oriented an angle of about 90° relative to the mounting arm 74, as shown in the illustrated embodiment. In a further aspect, the mounting arm 74 and the stabilizing arm 76 may be formed of a metal such as stainless steel, aluminum, or the like.

As described above, the handheld seed harvester 10 comprises the shoulder strap 80. The shoulder strap 80 is used to distribute the weight of the handheld seed harvester 10 away from the operator's arms. The shoulder strap 80 may be secured to the elongate handle in a number of ways. For example, in some aspects, the shoulder strap 80 may comprise the attachment clamp 82 for attaching the shoulder strap 80 to the elongate handle 20. In such aspects, the point at which the shoulder strap 80 is securable to the elongate handle 20 is adjustable to an operator's liking. The operator may adjust the point at which the shoulder strap 80 secures to the elongate handle 20 by, for example, sliding the attachment clamp 82 along the elongate handle 20 towards the hopper 60 until the handheld seed harvester 10 is about balanced on the shoulder strap 80. In some aspects, the attachment clamp 82 may be a circular clamp.

The shoulder strap 80 may be any suitable commercially available strap. As shown in the illustrated embodiment, the shoulder strap 80 may be a single strap in that it goes over only one shoulder. Alternatively, the shoulder strap 80 may be a dual strap harness that straps over both shoulders. In some aspects, the shoulder strap 80 may be manufactured from any suitable material such as nylon, polyester, and the like. In a further aspect, the length of the shoulder strap 80 may be adjustable using any suitable means. In general, the length of the shoulder strap 80 may be adjusted so that the handheld harvester sits at about waist-level of the operator. However, if the plants from which seeds are to be harvested are particularly short, the operator may lengthen the strap so that the handheld harvester 10 sits below the operator's waist, thereby reducing the need for the operator to bend over when harvesting the seeds.

The motor 30 is secured to the elongate handle 20 at an end opposite that of the hopper 60. By positioning of the motor 30 at an end of the elongate handle 20 that is opposite the hopper 60, the motor 30 and the hopper 60 may advantageously counter-balance each other's weight, thereby facilitating the use and maneuverability of the handheld seed harvester 10. The motor 30 may be any suitable motor. For example, the motor 30 may be an internal combustion engine such as those provided by Echo Power Equipment, Tanaka Power Equipment, and STIHL. In such aspects, the motor may be an engine having a size of about 20 cc to about 45 cc. Further, the engine may have a power output of about 1 bhp to about 2.5 bhp. Alternatively, the motor 30 may be an electric or battery-powered motor. In such aspects, the battery may have a capacity of about 2 Ah to about 5 Ah and may supply a voltage of about 15 V to about 40 V. The electric or battery-powered motors may be those supplied by RYOBI or SUN JOE.

In order to operate the handle seed harvester 10, an operator may approach the desired plants with the handheld harvester running and the reel 40 generally parallel with the ground. By using the handle assembly 70, the hopper 60 and the reel 40 will generally be positioned at a suitable height and angle. The filaments 50 of the reel 40 may then be brought into contact with the seeds of the plants. The seeds should be contacted with the upper half of the reel 40 so that when the filaments 50 contact the seeds, the seeds are pulled into the hopper 60 for collection. This may be accomplished by positioning the reel 40 below the seeds and then moving the reel 40 up the stalk of the plant. As the seeds are being harvested, the throttle speed of the motor 30 may be adjusted to harvest as many seeds as possible while leaving the leaves and stems of the plants behind. As will be appreciated, a higher throttle speed will collect more material from the plants but may, however, collect leaves and stems in addition to seeds.

LIST OF PARTS

10—Handheld seed harvester
20—Elongate handle
22—Bevel gear housing
30—Motor
40—Reel
42—Slot
50a, 50b, 50b—Filaments
52—Caps
60—Hopper housing
62—Hopper framework
64—hopper mounting plate
66—Hopper bag
68—Hopper bag attachment means
70—Handle assembly
72—Grip
74—Mounting arm
76—stabilizing arm
78a, 78b—Mounting arm attachment tabs
80—Shoulder strap
82—Attachment clamp
90—Drive roller
92—Bore (for receiving drive shaft therethrough)
94—Bore (for receiving and engagement with a nut)
96—Set screw
100—Spring—loaded idler
102—Insertable portion of spring—loaded idler
104—Stem of spring—loaded idler
106—Spring

The invention claimed is:

1. A handheld seed harvester comprising:
an elongate handle housing therein a driveshaft;
a motor engaged with the elongate handle and the driveshaft at an upper end of the elongate handle;
a bevel-gear housing and assembly engaged with a lower end of the elongate handle and the driveshaft;
a reel having a plurality of seed-stripping filaments extending outward therefrom, the reel rotatably and demountably engaged with the bevel-gear housing and assembly by way of a quick-release mechanism, the quick-release mechanism comprising (i) a drive roller configured to demountably engage a first end of the reel, said drive roller engaged with the bevel-gear assembly, and (ii) a spring-loaded idler configured to demountably engage a second end of the reel, said spring-loaded idler engaged with the hopper at an end opposite to the bevel-gear housing and assembly;

an open-faced hopper partially housing therein the reel;

a handle assembly secured to the elongate handle and the hopper; and a shoulder strap demountably engageable with a device provided therefor on the elongate handle.

2. The handheld seed harvester of claim 1, wherein the drive roller comprises one or more lugs extending laterally outward therefrom for demountably engaging one or more slots provided therefor in the first end of the reel.

3. The handheld seed harvester of claim 1, wherein the hopper is pivotally connected to the elongate handle.

4. The handheld seed harvester of claim 3, wherein the hopper is pivotable between a first position and a second position.

5. The handheld seed harvester of claim 1, additionally comprising a hopper bag configured for demountable engagement with the open-faced hopper.

6. The handheld seed harvester of claim 1, wherein the plurality of filaments comprises filaments having a diameter of 0.17 mm or 0.24 mm or 0.33 mm.

7. The handheld harvester of claim 6, wherein two or more of the plurality of filaments having the 0.33 mm diameter, are provided with a cap attached at their distal ends.

\* \* \* \* \*